United States Patent
Abdul Latheef et al.

(10) Patent No.: US 10,708,361 B2
(45) Date of Patent: Jul. 7, 2020

(54) VEHICLE COMMUNICATION SYSTEM USING LIGHT MODULATION

(71) Applicant: Honeywell International Inc., Morris Plains, NJ (US)

(72) Inventors: Rinas Puthuveetil Abdul Latheef, Mannarkkad (IN); Aravindan Cheruvally, Cochin (IN); Jareesh Myladan, Mandurai (IN); Ranjit Mathew Kumaracheril, Kochi (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/618,056

(22) Filed: Jun. 8, 2017

(65) Prior Publication Data

US 2018/0359320 A1 Dec. 13, 2018

(51) Int. Cl.
*H04B 10/00* (2013.01)
*H04L 29/08* (2006.01)
(Continued)

(52) U.S. Cl.
CPC ............ *H04L 67/12* (2013.01); *B60Q 1/0017* (2013.01); *G07C 9/00174* (2013.01);
(Continued)

(58) Field of Classification Search
USPC .......................................... 398/116, 118, 128
See application file for complete search history.

(56) References Cited

U.S. PATENT DOCUMENTS

| 5,572,183 A | 11/1996 | Sweeney |
| 6,064,299 A | 5/2000 | Lesesky et al. |

(Continued)

FOREIGN PATENT DOCUMENTS

| CN | 103617655 A | 3/2014 |
| GB | 2424778 A | 10/2008 |

(Continued)

OTHER PUBLICATIONS

Burchardt et al., "VLC: Beyond Point-to-Point Communication," 24 pages, Nov. 1, 2013.
(Continued)

*Primary Examiner* — David C Payne
*Assistant Examiner* — Pranesh K Barua
(74) *Attorney, Agent, or Firm* — Seager Tufte & Wickhem LLP

(57) ABSTRACT

A vehicle communication system includes an on-board vehicle communication module and a remote communication module. The on-board vehicle communication module includes a light source that is configured to be modulated in order to transmit data, an on-board controller that controls the light source and an on-board memory that is operably coupled to the on-board controller such that the on-board controller can obtain data from the on-board memory for transmission by the light source. The remote communication module includes a light receiver that is sensitive to the modulated light provided by the light source forming part of the on-board vehicle communication module. In some cases, the vehicle communication system enables bidirectional communication between the vehicle communication module and the remote communication module.

13 Claims, 6 Drawing Sheets

(51) Int. Cl.

| | | |
|---|---|---|
| *G08C 23/04* | (2006.01) | |
| *H04B 10/116* | (2013.01) | |
| *G07C 9/00* | (2020.01) | |
| *H04B 10/114* | (2013.01) | |
| *B60Q 1/00* | (2006.01) | |
| *H04B 10/516* | (2013.01) | |
| *H04B 10/66* | (2013.01) | |
| *G07B 15/06* | (2011.01) | |
| *H04B 1/3822* | (2015.01) | |

(52) U.S. Cl.
CPC .......... *G08C 23/04* (2013.01); *H04B 10/116* (2013.01); *H04B 10/1143* (2013.01); *H04B 10/516* (2013.01); *H04B 10/66* (2013.01); *G07B 15/063* (2013.01); *G07C 2009/00785* (2013.01); *H04B 1/3822* (2013.01)

(56) References Cited

U.S. PATENT DOCUMENTS

| | | | |
|---|---|---|---|
| 6,765,495 | B1 | 7/2004 | Dunning et al. |
| 7,497,019 | B2 | 3/2009 | Nash et al. |
| 7,626,507 | B2 * | 12/2009 | LaCasse ................ G08B 7/062 340/577 |
| 7,970,537 | B2 | 6/2011 | Ann et al. |
| 8,866,391 | B2 | 10/2014 | Ganick et al. |
| 9,107,039 | B2 | 8/2015 | Bae et al. |
| 9,270,627 | B1 | 2/2016 | Koo |
| 9,424,699 | B2 | 8/2016 | Kusens et al. |
| 2004/0170435 | A1 * | 9/2004 | Tzeng ................ H04B 10/1141 398/140 |
| 2008/0205892 | A1 * | 8/2008 | Baiden .................. H04B 13/02 398/104 |
| 2008/0260391 | A1 * | 10/2008 | Asukai ............... H04B 10/1143 398/140 |
| 2008/0281515 | A1 * | 11/2008 | Ann ....................... G01C 21/20 701/434 |
| 2010/0039494 | A1 * | 2/2010 | Horihata .................. B60R 1/00 348/14.02 |
| 2010/0207724 | A1 * | 8/2010 | Morii ..................... B60R 25/00 340/5.71 |
| 2011/0130915 | A1 * | 6/2011 | Wright ................ G01M 17/007 701/29.6 |
| 2011/0292214 | A1 * | 12/2011 | Plaster ................. G08B 13/183 348/159 |
| 2013/0191189 | A1 * | 7/2013 | Aparicio ................ G07B 15/02 705/13 |
| 2015/0016823 | A1 * | 1/2015 | Strassenburg-Kleciak .................. H04B 10/1143 398/115 |
| 2015/0025709 | A1 * | 1/2015 | Spaulding ............. G08G 1/163 701/2 |
| 2015/0037039 | A1 * | 2/2015 | Chang ..................... H04Q 9/00 398/106 |
| 2015/0228195 | A1 * | 8/2015 | Beaurepaire ......... G08G 1/0962 340/907 |
| 2015/0229391 | A1 * | 8/2015 | Choi .................... H04B 10/116 398/118 |
| 2015/0318922 | A1 * | 11/2015 | Poola ................... H04B 10/116 398/45 |
| 2016/0019729 | A1 * | 1/2016 | Rufo Torres ........... G07C 5/008 701/31.5 |
| 2016/0098676 | A1 | 4/2016 | Kusens et al. |
| 2016/0099774 | A1 * | 4/2016 | Sim ..................... H04B 10/116 398/115 |
| 2016/0148513 | A1 * | 5/2016 | Beaurepaire ........... G08G 1/164 701/117 |
| 2016/0173200 | A1 * | 6/2016 | Chaillan ............... H04B 10/116 398/115 |
| 2016/0189146 | A1 * | 6/2016 | Cattone .............. G06Q 20/3829 705/71 |
| 2016/0191159 | A1 * | 6/2016 | Aoyama .............. H04N 21/436 398/172 |
| 2016/0218807 | A1 * | 7/2016 | Tran ...................... F21V 29/006 |
| 2016/0247342 | A1 | 8/2016 | Kusens et al. |
| 2017/0200369 | A1 * | 7/2017 | Miller .................... G08G 1/20 |
| 2017/0213461 | A1 * | 7/2017 | Murray ............ G08G 1/096716 |
| 2017/0294099 | A1 * | 10/2017 | Sequeira ................. G01V 8/12 |
| 2018/0116011 | A1 * | 4/2018 | Yang .................... H04B 10/116 |
| 2018/0198523 | A1 * | 7/2018 | Liu ........................ H04B 10/60 |

FOREIGN PATENT DOCUMENTS

| | | |
|---|---|---|
| JP | 4825820 B2 | 11/2011 |
| WO | 2015013034 A1 | 1/2015 |
| WO | 016123303 A1 | 8/2016 |

OTHER PUBLICATIONS https://en.wikipedia.org/wiki/Li-Fi, "Li-Fi—Wikipedia, the Free Encyclopedia," 5 pages, printed Sep. 22, 2016.
Khairi et al., "Li-Fi the Future of Vehicular Ad hoc Networks," Transactions on Networks and Communications, vol. 3, Issue 3, Jun. 2, 2015.
Kim et al., "Smart Parking Information System Exploiting Visible Light Communication," International Journal of Smart Home, vol. 8, No. 1, pp. 251-260, 2014.
Yamazato et al., "Image-Sensor-Based Visible Light Communication for Automotive Applications," IEEE Communications Magazine, pp. 88-97, Jul. 2014.
Canadian Patent Application No. 3,004,219, "Vehicle Communication System Using Light Modulation," First Office Action, pp. 5, dated Mar. 20, 2019.

* cited by examiner

VEHICLE COMMUNICATION SYSTEM USING LIGHT MODULATION

TECHNICAL FIELD

The present disclosure pertains to communication systems such as vehicle communication systems that enable communication between a vehicle and a receiver that is remote from the vehicle and more particularly to vehicle communication systems employing light modulation.

BACKGROUND

There are many situations in which communication between a vehicle and a position exterior to the vehicle may be desired. One example is in controlling access to a parking facility. Typically, a driver is required to reach out to take a parking ticket, or to waive an access card in front of a card reader. This requires the driver to open their window or door, and takes time. In some cases, RFID card readers eliminate the need for the driver to manually interact with the card reader, but RFID can be subject to jamming and/or hacking, and there can be issues with interactions between adjacent RFID readers. There may be difficulties, for example, if an Entry RFID reader is in close proximity to an Exit reader. In some instances, there may be issues with a vehicle passing through multiple entrances or exits. Automatic vehicle license plate recognition is expensive, and is subject to license plates being duplicated or tampered with. A need remains for a vehicle communication system that is secure, yet simple to use.

SUMMARY

The present disclosure pertains generally to communication systems and more particularly to communication systems such as vehicle communication systems that enable communication between a vehicle and a receiver that is remote from the vehicle. In an example of the disclosure, a vehicle communication system enables communication between a vehicle and a receiver that is remote from the vehicle utilizing light modulation.

An illustrative vehicle communication system may include an on-board vehicle communication module and a remote communication module. The on-board vehicle communication module may include a light source that is configured to be modulated in order to transmit data, an on-board controller that controls the light source and an on-board memory that is operably coupled to the on-board controller such that the on-board controller can obtain data from the on-board memory for transmission by the light source.

In some cases, the on-board memory may be configured to store vehicle contents data. When so provided, the onboard controller may be configured to retrieve from the on-board memory the vehicle contents data for communication to the receiver that is remote from the vehicle. The remote communication module may include a light receiver that is sensitive to the modulated light provided by the light source forming part of the on-board vehicle communication module, a controller that is operably coupled with the light receiver and a memory. The memory may store data received from the on-board vehicle communication module via the light receiver and the remote controller.

In another example of the disclosure, an on-board vehicle communication module is configured to provide bidirectional communication between the on-board vehicle communication module and a remote receiver that is configured to send and receive LiFi communications. The illustrative on-board vehicle communication module includes a LiFi light source that is configured to be modulated in order to transmit data, and a controller that controls the LiFi light source. A LiFi light receiver is also operably coupled to the controller. A memory may be operably coupled to the controller such that the controller can obtain data from the memory for transmission by the LiFi light source. In some cases, the memory may be configured to store vehicle identification data, vehicle contents data, driver identification data and/or any other suitable data. The controller may be configured to retrieve from the memory the vehicle identification data, the vehicle contents data, driver identification data and/or any other suitable data for communication to a remote receiver.

In another example of the disclosure, an on-board vehicle communication module is configured to provide bidirectional communication between the on-board vehicle communication module and a remote device that is configured to send and receive LiFi communications. The on-board vehicle communication module includes a LiFi light source, a LiFi light receiver and a controller that is operably connected to the LiFi light source and the LiFi light receiver. The on-board vehicle communication module may be configured to control the LiFi light source and the LiFi light receiver to provide encrypted communication between the on-board vehicle communication module and the remote device.

In another example of the disclosure, an on-board vehicle communication module is configured to provide bidirectional communication between the on-board vehicle communication module and a remote receiver that is configured to send and receive LiFi communications. The on-board vehicle communication module may include a LiFi light source that is configured to be modulated at high speeds in order to transmit data, and a controller that controls the LiFi light source. A LiFi light receiver is also operably coupled to the controller. A video camera may be trainable on an interior of the vehicle and may be operatively coupled to the controller, which itself is configured to transmit video provided by the video camera to the remote receiver.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
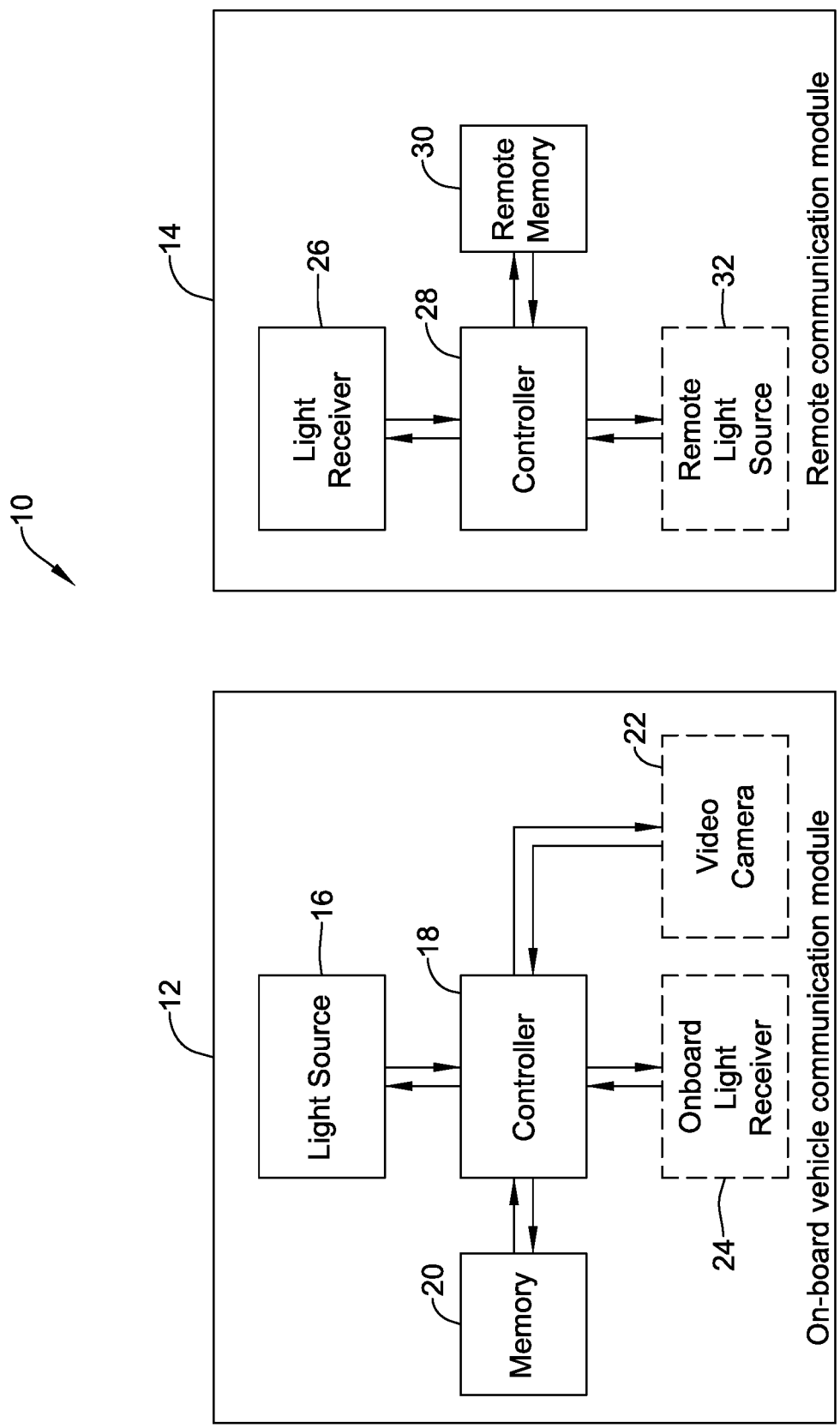
FIG. 1 is a schematic block diagram of an illustrative vehicle communication system in accordance with an example of the disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure pertains generally to communication systems and more particularly to communication systems such as vehicle communication systems that enable communication between a vehicle and a receiver that is remote from the vehicle. FIG. 1 is a schematic block diagram of an illustrative vehicle communication system 10 that enables communication via light modulation between a vehicle and a receiver that is remote from the vehicle. The illustrative vehicle communication system 10 includes an on-board vehicle communication module 12 that may, for example, be carried by a vehicle, and a remote communication module 14 that may, for example, be positioned relative to a parking structure, a security gate, or any other suitable structure, for communicating with the on-board vehicle communication module 12.

In some cases, the on-board vehicle communication module 12 may include a light source 16 that is configured to be modulated in order to transmit data. In some cases, the light source 16 may be built into a vehicle headlight, but this is not required. In some instances, the light source 16 may be a light emitting diode (LED) light source. In some cases, the light source 16 may be a visible light source. In some cases, the light source 16 may be an ultraviolet (UV) light source or an infrared (IR) light source. In some cases, the light source 16 may be a multi-band light source that operates in two or more bands, such as two or more of the visible light band, the UV light band, and the IR light band. In some cases, one band, such as the visible light band, may be used for illumination while another band may be used for communication. In some cases, the light source 16 includes a visible light source and one or more of an ultraviolet (UV) light some and an infrared (IR) light source.

In some cases, the light source 16 may be configured so that the light emanating from the light source 16, or at least particular wavelengths of the light emanating from the light source 16, may be modulated at a rate that can be used to transmit information without visibly affecting the visible light. In some cases, the light source 16 may be considered as being a LiFi (Light Fidelity) light source. LiFi can be implemented as a bidirectional, high-speed and fully networked wireless communication technology that is similar to WiFi. In some cases, LiFi provides higher bandwidth and greater security relative to other wireless communication technologies.

An on-board controller 18 may be configured to control the light source 16. An on-board memory 20 may be operably coupled to the on-board controller 18 such that the on-board controller 18 can obtain data from the on-board memory 20 for transmission by the light source 16. In some cases, the on-board memory 20 may be configured to store vehicle contents data. An illustrative but non-limiting example of vehicle contents data that may be stored within the on-board memory 20 includes inventory information that is related to an inventory of cargo that is currently being carried by the vehicle. In some cases, the vehicle contents data may include information related to a driver of the vehicle and/or a passenger of the vehicle.

In some instances, the on-board memory 20 may be configured to store vehicle identification data. In some cases, the on-board controller 18 may be configured to retrieve the vehicle contents data and/or the vehicle identification data from the on-board memory 20 for communication to a remote receiver. In some cases, the on-board vehicle communication module 12 may include its own power supply (not illustrated). In some instances, the on-board vehicle communication module 12 may be operably coupled to vehicle power.

In some cases, the on-board vehicle communication module 12 may include a video camera 22 that is operably coupled to the on-board controller 18. In some instances, the video camera 22 may be trained on an interior of the vehicle in which the on-board vehicle communication module 12 is located. In some cases, the video camera 22 may be trained on a cargo area of the vehicle, and the vehicle contents data may include video provided by the video camera 22 which may be transmitted to a remote receiver via the light source 16. In some cases, the video camera 22 may be trained on the driver and/or passenger of the vehicle, and a video provided by the video camera 22 may be transmitted to a remote receiver via the light source 16 for driver verification or the like. In some cases, multiple video cameras and/or still cameras may be included.

In some instances, the on-board vehicle communication module 12 may include an on-board light receiver 24 that is operably coupled to the on-board controller 18 such that the on-board vehicle communication module 12 can receive information from a remote source. In some cases, for example, the on-board vehicle communication module 12 may be configured to receive, via the on-board light receiver 24, a request from the remote communication module 14, to transmit designated information. In some cases, the on-board vehicle communication module 12 may be configured to receive, via the on-board light receiver 24, any suitable information such as weather information, emergency vehicle notifications, roadway information such as roadway hazards, detours, nearby business directories/directions. OPS maps, and other roadway information. In some cases, the on-board vehicle communication module 12 may be further configured to receive, via the on-board light receiver 24, proximity information from other vehicles. In some cases, the on-board controller 18 may be configured to present the received information on a suitable display in a manner that is easy for the driver or passenger to read and understood. For example, the on-board vehicle communication module 12 may include a display (not illustrated).

In some cases, the on-board light receiver 24 may receive information from remote devices that are situated on or along the roadway, such in stop lights, in overhead highway lights, in other vehicles, in gas pumps or at filling stations, and/or at other suitable locations. The light receiver may be a LiFi receiver. In some cases, the on-board light receiver 24 may receive information, such as from other vehicles and/or devices along the roadway, that facilitate unmanned vehicle operation, for example.

In some cases, the on-board vehicle communication module 12 may be configured to receive, via the on-board light receiver 24, information such as but not limited to an assigned loading dock, a map to the assigned loading dock, payment details, a signed bill of laden, traffic information, emergency vehicle notifications, and the like. In some cases, a user such as the driver may be able to turn the on-board vehicle communication module 12 on and off, as desired.

In some cases, the on-board vehicle communication module 12 may transmit information to a remote device. For example, the on-board vehicle communication module 12 may transmit data such as load details, vehicle data such as description, license plate, VIN (vehicle identification number), driver information including a photo of the driver, live pictures of the passenger(s) and/or the cargo areas, shipping orders, bill of laden, a complete inventory of all items to be delivered to that location, vehicle weight, vehicle dimensions (e.g. vehicle height, width, length), vehicle maintenance information such as current mileage and the GPS route that was taken during a particular period of time. In some cases, the data transmitted may include velocity information, such as but not limited to a maximum speed traveled during the day, an average speed, etc. For some application, the on-board vehicle communication module 12 may convey payment information from the vehicle to a remote devices to pay for goods and/or services. For example, in a parking facility application, the on-board vehicle communication module 12 may convey payment information to a remote device to gain access to the parking facility. In another example, at a gas station, the on-board vehicle communication module 12 may convey payment information to a remote device to pay for the gasoline pumped into the vehicle. These are just some examples.

In some cases, the remote communication module 14 may include a light receiver 26 that is sensitive to the modulated light provided by the light source 16 of the on-board vehicle communication module 12, as well as a remote controller 28 that is operably coupled with the light receiver 26. A remote memory 30 may be operably coupled to the remote controller 28. In some cases, the remote memory 30 may be configured to store data that is received from the on-board vehicle communication module 12 via the light receiver 26 and the remote controller 28. In some cases, the remote memory 30 may store a database of approved vehicles, based on their vehicle identification data, such that the remote communication module 14 can authorize vehicle access to a secured area for approved vehicles only. In some cases, the remote communication module 14 may include a remote light source 32 so that the remote communication module 14 can itself communicate information, sometimes to the on-board vehicle communication module 12 of a vehicle.

Figure 2:
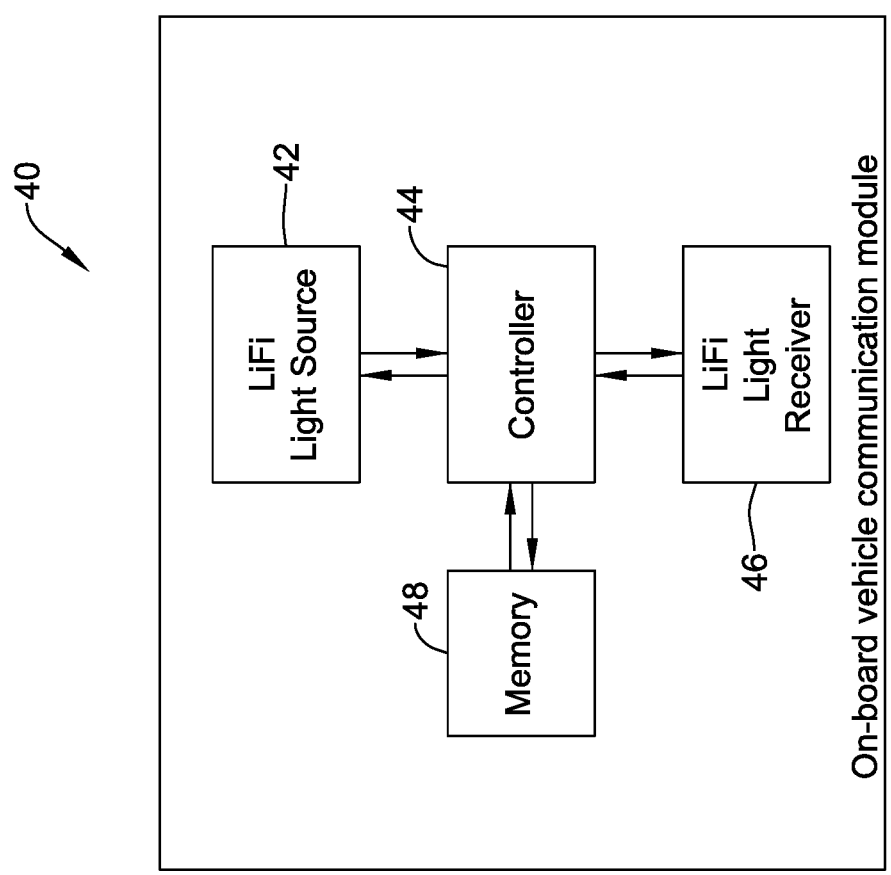
FIG. 2 is a schematic block diagram of an illustrative on-board vehicle communication module usable as part of a vehicle communication system in accordance with an example of the disclosure.

FIG. 2 is a schematic block diagram of an illustrative on-board vehicle communication module 40 that may, for example, be used as a part of a vehicle communication system such as the illustrative vehicle communication system 10 shown in FIG. 1. In FIG. 2, the illustrative on-board vehicle communication module 40 is configured to provide bidirectional communication between the illustrative on-board vehicle communication module 40 and a remote receiver that is configured to send and receive LiFi communications. The illustrative on-board vehicle communication module 40 includes a LiFi light source 42 that is configured to module a light output in order to transmit data. A controller 44 is operably coupled to the LiFi light source 42 and controls the LiFi light source 42. A LiFi light receiver 46 is also operably coupled to the controller 44. A memory 48 may be operably coupled to the controller 44 such that the controller 44 can obtain data from the memory 48 for transmission by the LiFi light source 42. In some cases, the memory 48 may be configured to store vehicle identification data, vehicle contents data, driver identification data and/or any other suitable data. The controller 44 may be configured to retrieve the vehicle identification data, vehicle contents data, driver identification data and/or any other suitable data for communication to a remote receiver. In some cases, for example, the vehicle contents data may include inventory information related to an inventory of cargo for delivery. In some cases, the vehicle identification data, the vehicle contents data, driver identification data and/or any other suitable data may include a picture and/or a video.

Figure 3:
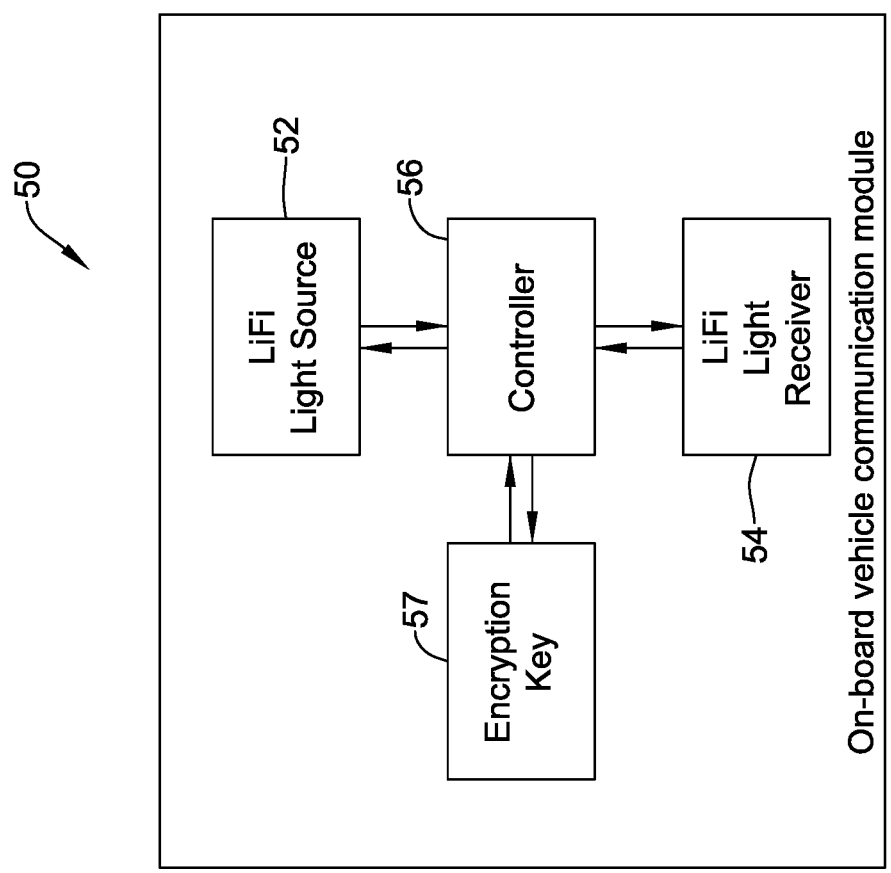
FIG. 3 is a schematic block diagram of an illustrative on-board vehicle communication module usable as part of a vehicle communication system in accordance with an example of the disclosure.

FIG. 3 is a schematic block diagram of an on-board vehicle communication module 50 that is configured to provide bidirectional communication between the on-board vehicle communication module 50 and a remote device that is configured to send and receive LiFi communications. The on-board vehicle communication module 50 includes a LiFi light source 52, a LiFi light receiver 54 and a controller 56 that is operably coupled to the LiFi light source 52 and to the LiFi light receiver 54. The controller 56 may be configured to control the LiFi light source 52 and the LiFi light receiver 54 in order to provide encrypted communication between the on-board vehicle communication module 50 and the remote device. The controller 56 may store or access an encryption information such as one or more encryption keys 57 that are used for encrypting and/or decrypting the communication between the on-board vehicle communication module 50 and the remote device. In some cases, the encryption key 57 may enable exchange of encryption credentials with another device, and thus can be used to facilitate secure communication. In some cases, encryption keys such as the encryption key 57 have a limited life span, for security, and are periodically updated or replaced. In some cases, only data transmitted via the LiFi light source 52 is encrypted. In some cases, only data received via the LiFi light receiver is encrypted. In some cases, both data transmitted via the LiFi light source 52 and data received via the LiFi light receiver is encrypted.

In some cases, the remote device may be operably coupled to the Internet, and the encrypted communication may provide the on-board vehicle communication module 50 with secure Internet access. This may be used, for example, by a truck driver to gain secure Internet access at a truck stop, at traffic light, or any other location that has a compatible LiFi remote device connected to the Internet. In some cases, the encrypted communication may include multi-band communication. For example, the LiFi light source and/or LiFi light receiver 54 may support encrypted communication on two or more of the visible light band, the UV light band, and the IR light band.

Figure 4:
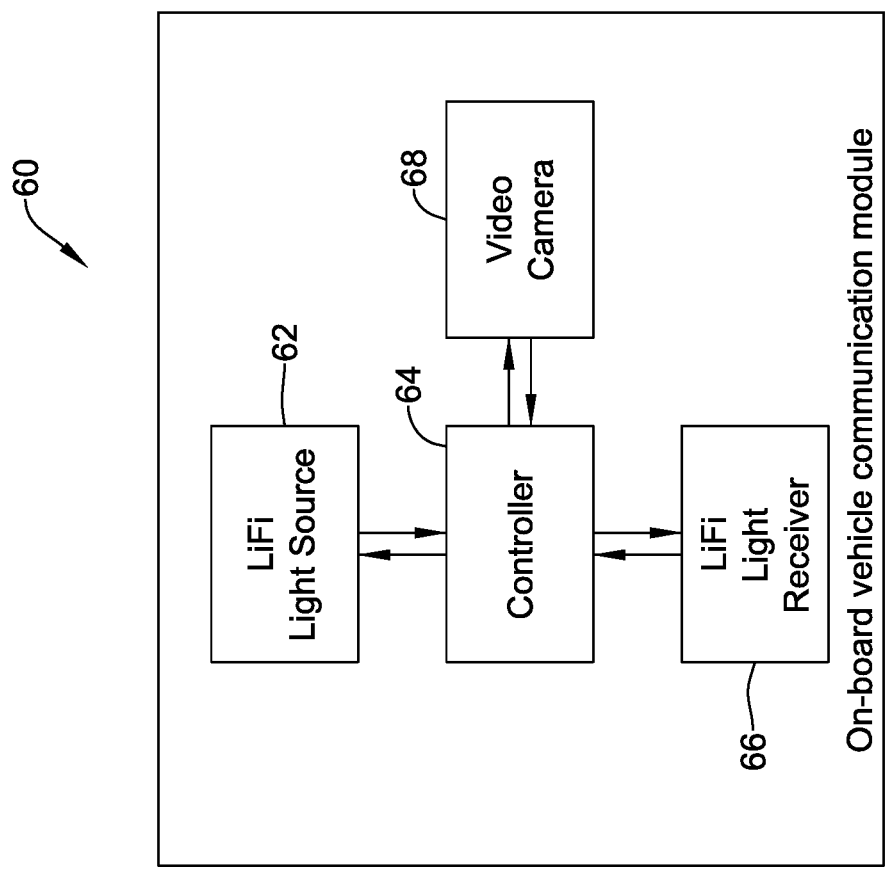
FIG. 4 is a schematic block diagram of an illustrative on-board vehicle communication module usable as part of a vehicle communication system in accordance with an example of the disclosure.

FIG. 4 is a schematic block diagram of an illustrative on-board vehicle communication module 60 that is configured to provide bidirectional communication between the illustrative on-board vehicle communication module 60 and a remote device that is configured to send and receive LiFi communications. The illustrative on-board vehicle communication module 60 includes a LiFi light source 62 that is configured to be modulated at high speeds in order to transmit data. A controller 64 controls the LiFi light source. A LiFi light receiver 66 is operatively coupled to the controller 64. A video camera 68 may be trainable on an interior of the vehicle and may be operatively coupled to the controller 64. The controller 64 may, for example, be configured to transmit video that is provided by the video camera 68 to the remote receiver.

Figure 5A:
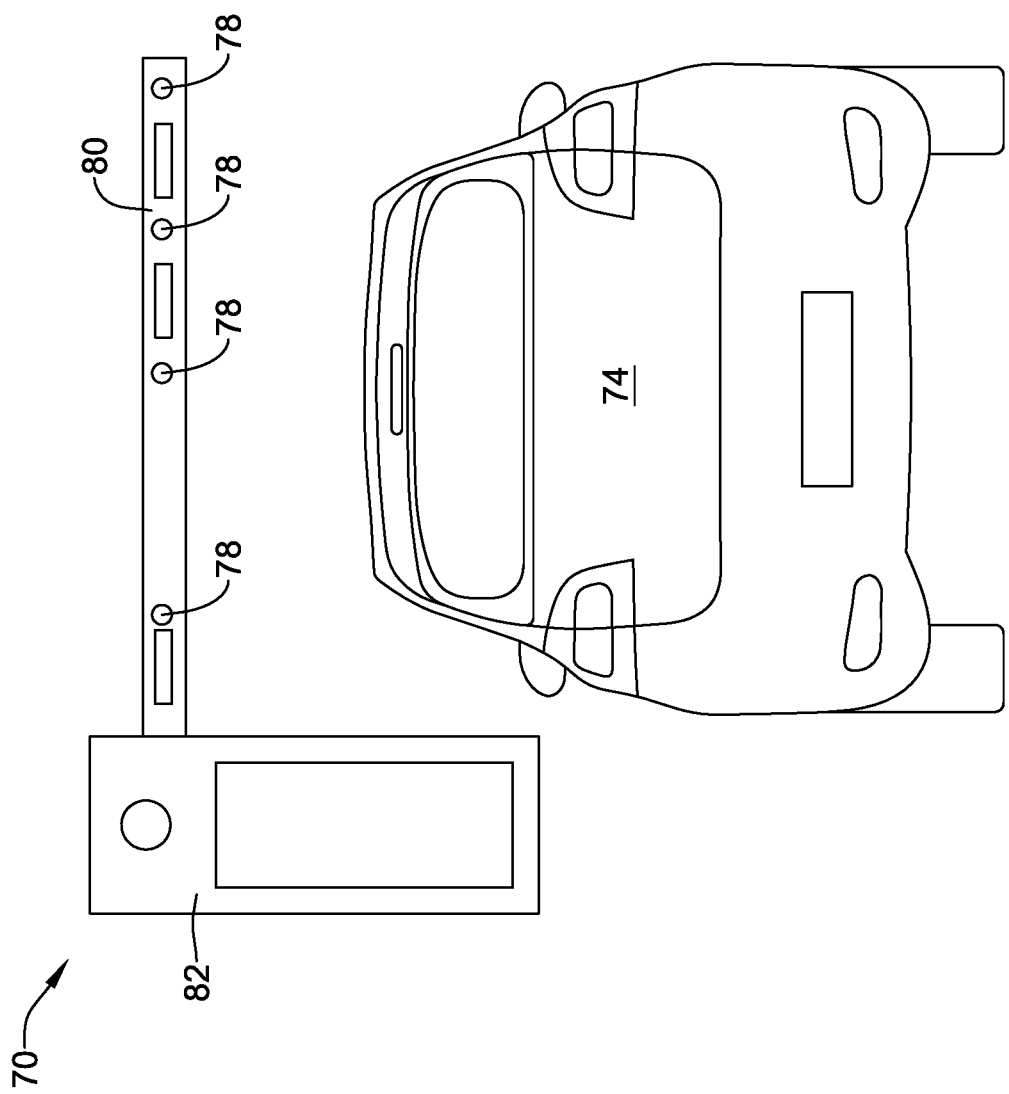
FIGS. 5A and 5B provide an example of a vehicle communication system in accordance with an example of the disclosure.
Figure 5B:
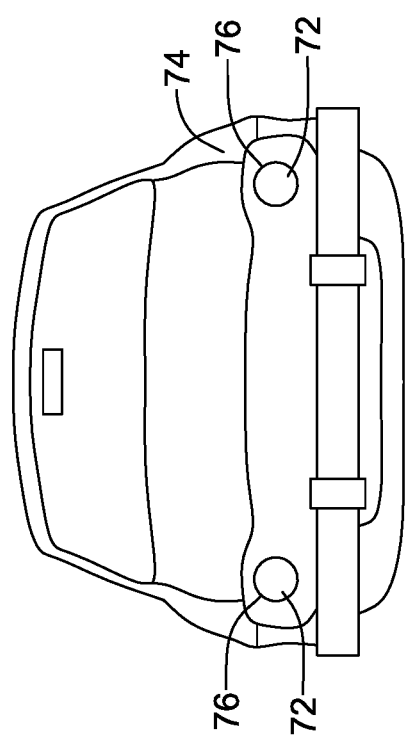

FIGS. 5A and 5B show an illustrative vehicle access control system 70 that may use a vehicle communication system such as the illustrative vehicle communication system 10 shown in FIG. 1. The illustrative vehicle access control system 70 may control access to a secure area such as a parking facility, a warehouse facility that accepts deliveries, a government facility and/or any other secure area. In some cases, such as a parking facility, the LiFi communication may convey payment information from the vehicle to the illustrative vehicle access control system 70.

As seen for example in FIG. 5B, the illustrative vehicle access control system 70 is installed at a parking facility. The illustrative vehicle access control system 70 includes LiFi sources 72, built into each of the headlights 76 of a vehicle 74. In some cases, the LiFi sources 72 may be separate from the headlights 76. The illustrative vehicle access control system 70 includes LiFi receivers 78 that are built into or otherwise secured relative to a gate 80. In this example, the LiFi sources 72 are able to transmit a vehicle identification code, or other data, that is received by the LiFi receivers 78. A gate controller 82, which raises and lowers the gate 80, may receive vehicle identification codes, or other data, from the LiFi receivers 78 and can compare to a database of approved vehicles. If the codes match, the gate controller 82 raises the gate 80 and allows the vehicle 74 to proceed.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A vehicle communication system that enables communication with a vehicle the vehicle communication system utilizing light modulation to communicate, the vehicle communication system comprising: an on-board vehicle communication module including: a light source that is configured to be modulated in order to transmit data; an on-board controller that controls the light source; an on-board memory operably coupled to the on-board controller such that the on-board controller can obtain data from the on-board memory for transmission by the light source; and a video camera mounted in the vehicle and trained on a driver region of the vehicle in which the video camera is mounted; the on-board memory further configured to store vehicle contents data comprising inventory information related to an inventory of cargo currently carried by the vehicle as well as one or more images provided by the video camera; the onboard controller configured to retrieve from the on-board memory the vehicle contents data for communication to a remote communication module that is remote from the vehicle; an on-board light receiver operably coupled to the on-board controller such that the on-board vehicle communication module is configured to receive information from a remote source; and the remote communication module including: a light receiver that is sensitive to the modulated light provided by the light source forming part of the on-board vehicle communication module; a remote controller operably coupled with the light receiver; a remote memory operably coupled to the remote controller; the remote memory configured to store data received from the on-board vehicle communication module via the light receiver and the remote controller.

2. The vehicle communication system of claim 1, wherein: the on-board memory is configured to store vehicle identification data; and the onboard controller is configured to retrieve from the on-board memory the vehicle identification data for communication to the receiver that is remote from the vehicle.

3. The vehicle communication system of claim 1, wherein the light source comprises a vehicle headlight.

4. The vehicle communication system of claim 1, wherein the light source comprises a visible light source, and one or more of an ultraviolet (UV) light source and an infrared (IR) light source.

5. The vehicle communication system of claim 1, wherein the vehicle contents data further comprises identification information of a driver currently driving the vehicle.

6. The vehicle communication system of claim 1, wherein the vehicle contents data further comprises identification information of a passenger currently in the vehicle.

7. The vehicle communication system of claim 1, wherein the on-board communication module is configured to receive, via the on-board light receiver, a request from the remote communication module for the on-board communication module to transmit designated information.

8. The vehicle communication system of claim 1, wherein the on-board communication module is further configured to receive, via the on-board light receiver, proximity information from other vehicles.

9. The vehicle communication system of claim 1, wherein on-board communication module is further configured to receive, via the on-board light receiver, roadway information from light sources disposed relative to the roadway.

10. The vehicle communication system of claim 1, wherein the remote communication module further comprises a remote light source so that the remote communication module can itself communicate information.

11. The vehicle communication system of claim 2, wherein the remote memory stores a database of approved vehicles, based on their vehicle identification data, such that the remote communication module is configured to provide vehicle access for approved vehicles to a secure location.

12. A system comprising:
an on-board vehicle communication module comprising:

a LiFi light source that is configured to be modulated in order to transmit data;
a controller that controls the LiFi light source;
a LiFi light receiver operably coupled to the controller;
a memory operably coupled to the controller such that the controller can obtain data from the memory for transmission by the LiFi light source;
the memory configured to store vehicle identification data;
the memory further configured to store vehicle contents data that comprises driver identification data including a photo of a current driver of the vehicle for driver verification taken by a camera mounted in the vehicle and trained on a driver area of the vehicle and inventory information related to an inventory of cargo currently carried by the vehicle;
a remote receiver comprising:
  a light receiver that is sensitive to the modulated light provided by the LiFi light source forming part of the on-board vehicle communication module;
  a remote controller operably coupled with the light receiver;
  a remote memory operably coupled to the remote controller; and
  the remote memory configured to store data received from the on-board vehicle communication module via the light receiver and the remote controller
the controller of the on-board vehicle communication module is configured to retrieve from the memory of the on-board vehicle communication module the vehicle identification data and the vehicle contents data for communication to the remote receiver.

13. The on-board vehicle communication module of claim 12, wherein the vehicle identification data and/or the vehicle contents data comprises a live picture and/or a video of an interior of the vehicle.

* * * * *